April 5, 1966 S. MEURER 3,244,159
FUEL INJECTION INTERNAL COMBUSTION ENGINE
Filed Sept. 5, 1963
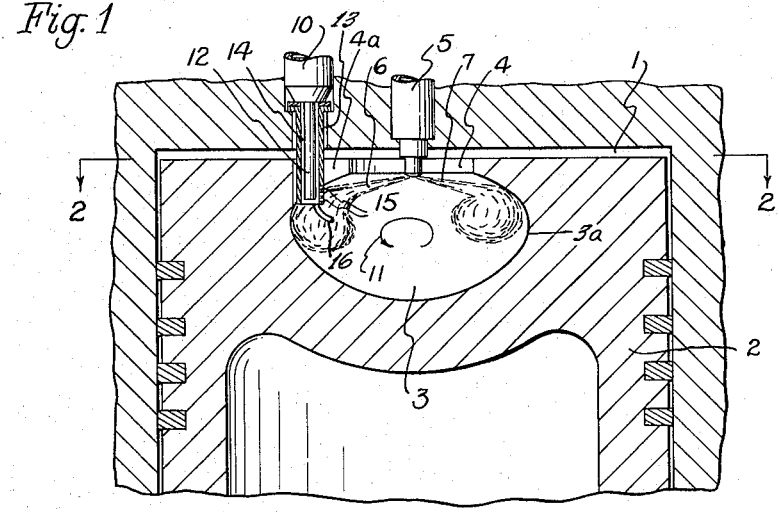
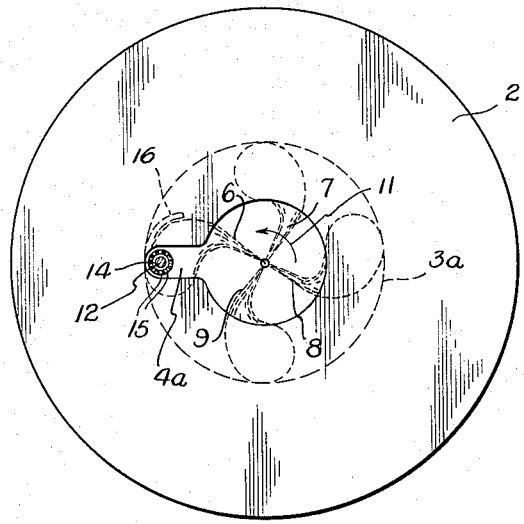
INVENTOR
Siegfried Meurer
BY Bailey, Stephens and Huettig
ATTORNEYS United States Patent Office 3,244,159
Patented Apr. 5, 1966

3,244,159
FUEL INJECTION INTERNAL COMBUSTION ENGINE
Siegfried Meurer, Nurnberg, Germany, assignor to Maschinenfabrik Augsburg-Nurnberg A.G., Nurnberg, Germany
Filed Sept. 5, 1963, Ser. No. 306,949
Claims priority, application Germany, Sept. 13, 1962, M 54,214
4 Claims. (Cl. 123—32)

This invention relates to a fuel injection internal combustion engine having a combustion chamber in the piston or in the cylinder head. The liquid fuel is injected into the combustion chamber by means of a nozzle having a single or a plurality of outlet orifices, and the fuel is ignited by means of a glow plug or spark plug.

According to this invention, a unidirectional air swirl is formed in the combustion chamber and the fuel injected into this air swirl to form a fuel-air mixture on the largest peripheral zone of the combustion chamber wall and in the area of the ignition member. It is important that the air swirl has zones in which are strong centrifugal forces and into which zones the liquid fuel is introduced. Due to the difference in the specific gravity of the fuel, especially liquid fuel, and the hot air, that is the mass density of a fuel particle as compared to air, the fuel particles are thrown outwards by centrifugal force so that a rich fuel and air mixture forms along the peripheral wall of the combustion chamber and then this mixture is ignited by the ignition member. Consequently, when anti-knock fuels are used, there is no self-ignition and no Otto-cycle knocking which would occur under self-ignition. This means that it is possible to use a compression ratio of about 17 to 1 for an engine using anti-knock fuels. This compression ratio is in the range of the ratios required for compression ignition engines using fuels having an appropriately high cetane number.

Heretofore, it was only possible in engines using spark plug ignition or other ignition devices to employ moderate compression ratios with about 10 to 1 being the maximum due to the distribution of the fuel over the entire volume of air in the combustion chamber because knocking occurred above this ratio. Even the so-called medium pressure engines had to be limited to a maximum compression ratio of 14 to 1 due to the danger of knocking.

In this invention, using compression ratios of up to about 17 to 1, if only one fuel jet is used, it is preferred to spray the fuel into the combustion chamber in the same direction as the air swirl, that is directly into the zone of the centrifugal forces. If a multi-spray nozzle is used, as, for example, a four-spray nozzle, it is preferred to position this nozzle on the center line or longitudinal axis of the combustion chamber and direct the fuel sprays in equal amounts radially toward the periphery of the chamber. The spray pattern, the injection pressure and the intensity of the air swirl are correlated, depending upon the shape of the combustion chamber, preferably a chamber with the shape of a solid of revolution, so that a rich fuel and air mixture is formed along the combustion chamber wall. Thus a completely annular mixing zone for the fuel and air is formed with an appropriately intensive air swirl around the longitudinal axis of the cylinder as the optimum and which leads to an approximately uniform combustion process. It is important that the greatest possible enriched fuel-air mixture occurs along the wall of the combustion chamber and does not exclude the possibility of obtaining good results when special shapes are used for the chamber for the creation of individual mixing zones.

The means by which the objects of the invention are obtained are described more fully with reference to the accompanying drawings in which:

FIGURE 1 is a lonigtudinal cross-sectional view through an engine with a piston having an electrical combustion chamber; and FIGURE 2 is a plan view taken on the line 2—2 of FIGURE 1.

In the partly shown cylinder 1 is a piston 2 having a combustion chamber 3 in the shape of an elliptical body of rotation. A constricted neck 4 extends from the combustion chamber through the crown of the piston. Fuel injection nozzle 5 is positioned on the longitudinal axis of both the piston and the cylinder. This nozzle has four fuel outlet orifices to form fuel jets 6, 7, 8 and 9 which in plan view are shown as being spaced at 90° from each other and directed radially or almost radially toward the combustion chamber wall. The nozzle is oriented so that fuel jet 6 is directed into the wall area in which the ignition member 10 is positioned as later described. In combustion chamber 3, an air swirl is initially created by means of a swirl intake port or a masked valve to cause the air to rotate in the direction of the arrow 11 and around the axis of the chamber. When the fuel is injected, the four fuel jets 6, 7, 8 and 9 first cut through the rotating air in a compartively compact condition without mixing with the air to any great extent. Due to the chosen correlation between the shape of the combustion chamber, the fuel injection pressure, the spray pattern and the intensity of air flow, these four fuel jets disperse and are blown away just before reaching the wall of the combustion chamber.

This means that along the largest periphery 3a of the combustion chamber, the centrifuging air swirl is extensively enriched with the major portion of the fuel particles. Any portion of the fuel jet or jets which strikes the wall of the combustion chamber is deflected and carried into the centrifuging air swirl more or less in the form of a splatter or possibly vaporized condition and satisfies the requirements of this invention. A heterogeneous mixture of fuel particles and air is thus formed in the chamber. For part-load operation of the engine, the throttling of the intake air is entirely omitted according to this invention because qualitative fuel control is used rather than quantitative control.

The fuel and air mixture flowing along the largest periphery 3a of the wall of the chamber and which is extensively enriched with fuel particles is then carried by the air swirl to the ignition member 10 which extends into the air swirl and ignites the fuel.

The ignition member shown is an electrically heated glow plug having an igniting element 12 which extends into the peripheral zone of the air swirl when the piston is at top dead center. For doing this, the combustion chamber neck has a slot 4a into which the igniting element extends and which also provides for the thermal expansion of the neck 4. A suitably sized hole in the piston crown can be substituted for this slot. The igniting element 12 is surrounded by a protecting jacket 13 secured to the ignition member so that the lower end of the igniting element 12 is exposed to the combustion chamber but its side enclosed. This jacket 13 is separated from element 12 to form a space 14. The function of jacket 13 is to prevent the air swirl from cooling the igniting element 12 and thus interfering with its operation. In order to improve the supply of the fuel and air mixture to element 12, the jacket 13 has a number of openings 15 directed perpendicular to the direction of the air swirl and which openings may also be distributed around the entire circumference of the jacket. Means for guiding a concentrated supply of fuel and air mixture into jacket 13 is provided by a guide duct 16 positioned at a suitable place on the wall of the combustion chamber. A deflector plate

Having now described the means by which the objects of the invention are obtained,

I claim:

1. In an internal combustion engine having a cylinder with a longitudinal axis, a piston in said cylinder, a wall forming a combustion chamber concentric with said axis and associated with said cylinder, a fuel injection nozzle aligned with said axis, a fuel ignition member, and means for forming a unidirectional air swirl in said chamber, the improvement in which said nozzle is oriented to inject fuel toward said ignition member and into said air swirl to form a rich fuel and air mixture containing the major portion of the fuel particles along and spaced from said wall in the area containing said ignition member.

2. In an engine as in claim 1, said combustion chamber being in said piston, an opening in said piston through the piston crown to said chamber for receiving said ignition member, and said ignition member extending to the middle portion area of said wall.

3. In an engine as in claim 2, said combustion chamber being in said piston, and said opening being a slot in said chamber wall for receiving said ignition member.

4. A method of burning fuel in a fuel injection internal combustion engine having a combustion space and a fuel igniting element positioned at the periphery of said space comprising forming a unidirectional air swirl in said space at up to about a 17 to 1 compression ratio, injecting fuel into said air swirl so that the major portion of the fuel particles are centrifuged to form such a heterogeneous rich fuel particle and air mixture at the periphery of said combustion space, and then igniting said fuel and air mixture by said igniting element to vaporize and burn all the fuel particles in said combustion space while obtaining a knock-free combustion when using compression ratios greater than 10 to 1.

References Cited by the Examiner
UNITED STATES PATENTS

| | | | |
|---|---|---|---|
| 2,046,263 | 6/1936 | Hesselman | 123—32.2 |
| 2,975,773 | 3/1961 | Meurer | 123—30.21 |
| 3,107,658 | 10/1963 | Meurer | 123—30.21 |
| 3,125,079 | 3/1964 | Hoffman | 123—30.21 |
| 3,125,080 | 3/1964 | Hoffman | 123—30.21 |

MARK NEWMAN, *Primary Examiner.*

RICHARD B. WILKINSON, *Examiner.*

L. M. GOODRIDGE, *Assistant Examiner.*